Sept. 19, 1933.   S. J. POPLAWSKI   1,927,184
MIXING CUP
Filed July 25, 1931

Inventor
S. J. Poplawski

Patented Sept. 19, 1933

1,927,184

UNITED STATES PATENT OFFICE 1,927,184

MIXING CUP

Stephen J. Poplawski, Racine, Wis.

Application July 25, 1931. Serial No. 553,056

6 Claims. (Cl. 259—135)

This invention relates to drink mixing devices and more particularly to drink mixing devices of the type embodying an internal propeller or agitator carried directly by the mixing vessel or container.

In mixing devices of this character, the mixing container is provided with a depending outwardly flared skirt, such as shown in my Patent #1,480,-914, issued to me January 15, 1924, for the purpose of protecting the operating parts of the mixer from any portions of the beverages which might ride over the upper edge of the container during the agitating of the beverages. The provision of the flared skirt rendered mixers of this type objectionable in use for a number of different reasons and primarily because the containers could not be nested one within the other when the containers were not in use.

It is, therefore, one of the primary objects of my invention to provide a novel drink mixer of the above character in which the provision of the flared skirt on the mixing container is entirely eliminated, novel means still being provided for effectively protecting the working parts of the mixing device from any portion of the spilled beverage.

Another salient object of my invention is the provision of a cup carried directly by the base of the mixer for receiving the mixing container, the cup acting to center the container to facilitate the connection of the armature shaft of the base carried motor, with the internal propeller or agitator of the mixing container.

Another important object of my invention is the provision of means for forming the cup, whereby the same not only acts as means for supporting and centering the mixing container, but also as means for preventing the spilled liquid from flowing on operating parts of the mixer, and for supporting the motor.

A further object of my invention is the provision of novel means for forming the container whereby a durable and rigid structure will be had, and whereby the propeller or agitator and its associated parts can be readily removed from the container, when necessary or desirable, for the purpose of cleaning or repairing.

With these and other objects in view, the invention consists in the novel construction, arrangement and formation of parts, as will be hereinafter more specifically described, claimed and illustrated in the accompanying drawing, in which:

Figure 1:
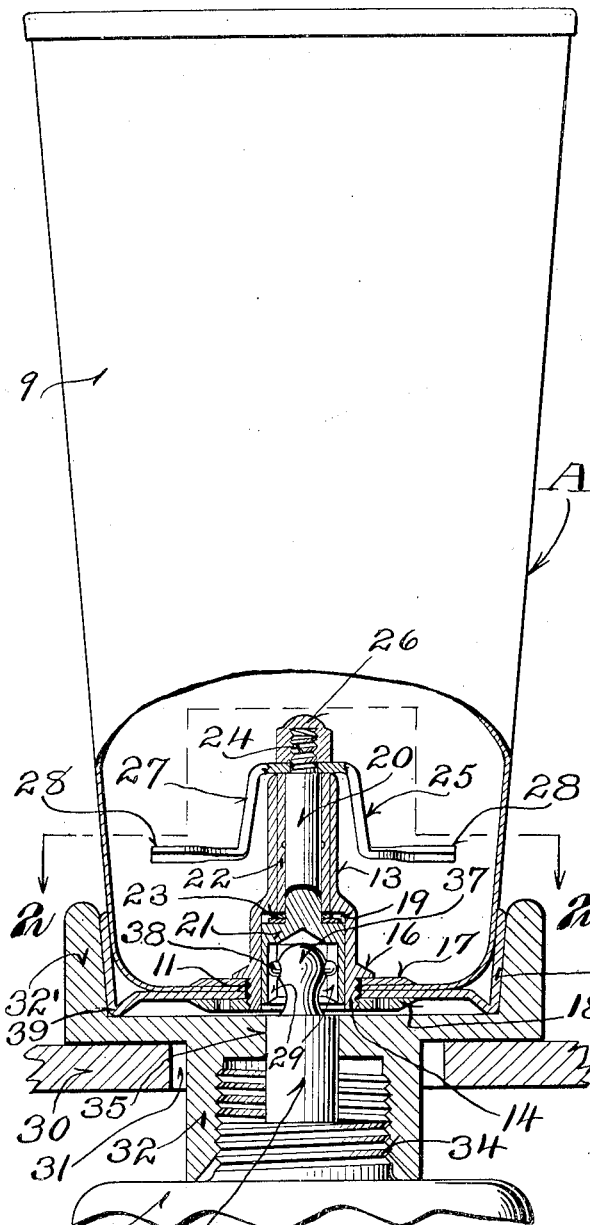
Figure 1 is a fragmentary vertical section of my drink mixing machine, illustrating the novel construction of the cup, mixing container and the novel connection between the armature shaft and drive motor and the agitator of the mixing container, parts of the view being shown in side elevation.
Figure 2:
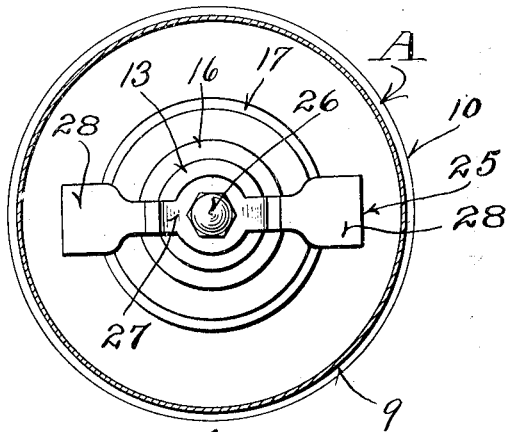
Figure 2 is a horizontal section through the container taken on the line 2—2 of Figure 1, looking in the direction of the arrows.
Figure 3:
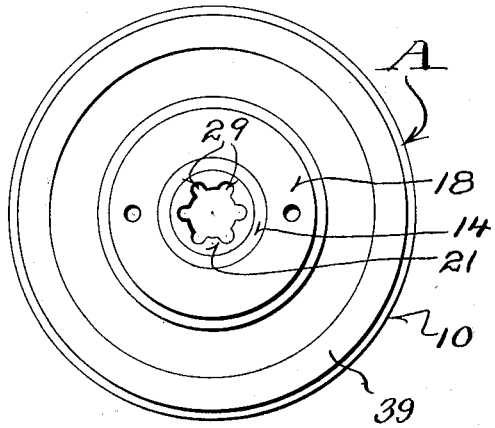
Figure 3 is a bottom plan view of the mixing container constructed in accordance with my invention.

Referring to the drawing in detail, wherein similar reference characters designate corresponding parts throughout the several views, the letter "A" generally indicates my improved drink mixing receptacle, which includes a body 9 which can be made of sheet metal pressed or spun into shape, or formed in any desired way. Pressed on the lower end of the body of the container, is a reinforcing cup-shaped base 10 which can be formed of heavier material than the container, if preferred. As clearly shown, the container and its base 10 gradually tapers toward the lower end, so that a plurality of the containers can be readily nested for shipping, or when the same are not in use. The bottom wall of the container at its axial center and the bottom wall of the cup-shaped base 10 are provided with registering openings 11.

The walls of these openings are preferably of a substantially circular shape, but the side of the openings at opposite diametric points are provided with straight or flattened faces 12.

Figures 6, 7:
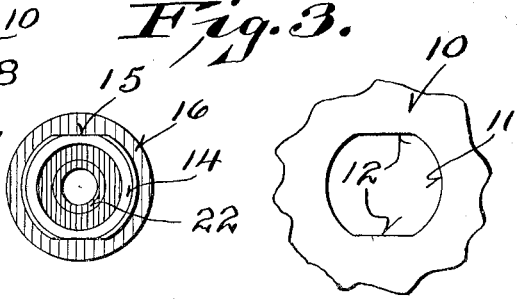
Figure 6 is a bottom plan view of the sleeve carried by the container for receiving the drive shaft or spindle for the propeller or agitator.
Figure 7 is a fragmentary bottom plan view of the container, with all of the operating parts removed therefrom, and illustrating the construction of the bottom wall of the container for receiving the supporting sleeve.
Figures 4, 5:
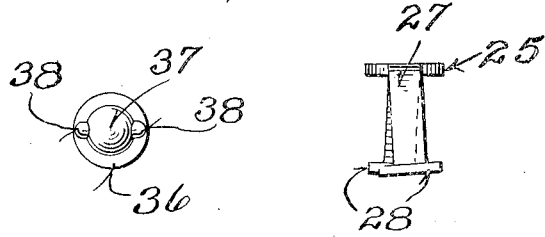
Figure 4 is a top plan view of the end of the armature shaft of the motor, illustrating the novel drive head carried thereby for the propeller or agitator.
Figure 5 is a detailed side elevation of the propeller or agitator.

Arranged within the container is a hollow bearing post or sleeve 13, and the lower end of this post is provided with a threaded extension or nipple 14, which is inserted through the openings 11 in the bottom of the container. By referring to Figure 6 of the drawing, it is to be noted that the opposite sides of the nipple or threaded extension 14 are provided with straight or plane faces 15 for engaging the flat sides 12 of the openings 11, whereby turning movement of the hollow post 13 will be prevented relative to the container. The hollow post 13 directly above the threaded extension or nipple 14 is provided with an annular outstanding flange 16 for engaging against the bottom wall of the container. As shown, a disc-shaped metal washer 17 can be interposed between the flange 16 and the bottom of said container. A flat holding nut of relatively great external diameter 18 is threaded on the end of the post on the threaded extension 14 thereof, into intimate contact with the lower end of the container. This effectively mounts the hollow post 13 in the container and precludes leakage at the opening 11.

It is observed that at the peripheral edge of the container bottom, there is a small depending annular bead or rib 39 to provide a shallow space sufficient to accommodate the flat nut 18.

It is to be noted that the bore of the hollow post adjacent to its lower end is enlarged as at 19 for the purpose, which will be later described.

Rotatably mounted within the hollow post 13 is the driven shaft or spindle 20 and the lower end of the same is provided with a hollow head 21 which is received in the enlarged portion 19 of the bore. I can provide a bearing sleeve 22 between the spindle 20 and the post and I can likewise provide bearing washers 23 between the head 21 of the spindle and the bearing sleeve 22. The upper end of the spindle is provided with a reduced threaded extension 24 which projects beyond the inner end of the hollow post 13. This spindle receives the propeller or agitator 25 and a cap nut 26 is fitted on the threaded end 24 of the spindle into engagement with the bearing sleeve. This unites the propeller or agitator 25, with the driven shaft or spindle, and assures the proper rotation of the agitator or propeller with said spindle.

It is to be noted that the propeller or agitator 25 embodies an inverted substantially U-shaped body or hub portion 27 and that the terminals of the legs of the said inverted U-shaped body portion are provided with the radially extending blades 28. The opposed blades 28 are bent or canted in opposite directions so as to have the proper action on the material being mixed.

The hollow head 21 has its inner face provided with a series of equally distantly spaced grooves or driving ways 29 for the purpose, which will be later described.

The drink mixing device may embody any preferred type of base or casing 30 and the top wall thereof is provided with an opening 31 through which extends a depending hollow internally threaded boss 32. This boss is formed on the lower face of a supporting and centering cup 32' which is arranged on the upper face of the top wall of the casing 30 of the drink mixing device. The container is adapted to snugly fit within the supporting and centering cup and supports the container in proper position during the agitating of the beverage in said container.

An electric drive motor 33 is arranged within the drink mixing casing 30 and the casing of the motor 33 is provided with a threaded extension 34 which is threaded into the depending hollow boss 32. By this construction, it can be seen that the motor is connected directly to and supporting from the centering cup 32'.

The lower wall of the centering and supporting cup 32' is provided with an axial bearing opening 35 into which projects the armature shaft 36 of the motor.

The upper end of the armature shaft 36 is provided with a spherical shaped driving head 37. At opposite diametric points, the driving head has formed thereon, outwardly projecting driving pins or teats 38. Thus, it can be seen that the driving head 37 and the pins 38 are arranged within the cup above the bottom wall thereof.

In the use of my mixing container, the contents of the beverage to be mixed is placed in the container in the ordinary manner and the same is inserted in the cup 32' which will center the container relative to the cup and guide the spherical driving head 37 into the enlarged portion or head 21 of the spindle 20 with the drive pins 38 in any selected pair of grooves or guide ways 29 formed on the inner face of said head 21. The circuit to the motor can be closed in any preferred or desired manner, and it is obvious that a switch can be automatically actuated upon the placing of the container in the cup for automatically setting the motor in operation.

By the construction shown and described, it can be seen that I have entirely eliminated the flared skirt generally associated with the mixing container and placed all driving parts within the body of the container, which permits a plurality of mixing containers to be readily nested and that in lieu of the skirt, I have provided a centering and supporting cup carried directly by the casing which not only takes the place of the flared skirt, but which also eliminates any additional support or centering device for the container.

Changes in details may be made without departing from the spirit or the scope of the invention, but what I claim as new is:

1. In a drink mixer, the combination of a mixing container having an internal agitator disposed entirely above the bottom wall thereof, coupling means for connecting the agitator with a driving element accessible from the bottom of the container but disposed inwardly of the bottom wall of the container, a supporting base, a container centering member carried by the supporting base and adapted to snugly embrace the lower end of the container and hold the same against movement, a drive element extending upwardly through the centering member to project above the bottom wall of the container and engage the coupling means thereof, and power means beneath the centering member for driving the drive element.

2. In a drink mixer the combination of a mixing container having a built-in agitator disposed entirely above the bottom wall of the container, coupling means for drivingly connecting the agitator with a driving element accessible from the bottom of the container and having a part thereof projecting above the bottom wall of the container, a centering and supporting member for the container having a substantially horizontal wall and means projecting upwardly therefrom to snugly embrace the lower end portion of the container to hold the same with the bottom wall of the container closely adjacent said horizontal wall, a drive element extending through said horizontal wall with a coupling part projected thereabove for engagement with the coupling means of the agitator above the bottom wall of the container, and a drive motor for said element suspended from said centering member beneath the horizontal wall.

3. In a drink mixer, a hollow supporting base, an open topped centering cup mounted on the supporting base and adapted to snugly receive the lower end portion of a mixing container to firmly hold the same with its bottom wall slightly spaced from the bottom of the centering cup, said mixing container having an internal agitator provided with a coupling unit accessible from its bottom, an electric motor readily detachably supported from the centering cup within the hollow supporting base, and a drive element connected with the electric motor and projecting upwardly into the centering cup for driving connection with the coupling unit of the agitator.

4. In a drink mixer, a hollow supporting base having an opening in its top wall, an open topped centering cup mounted on the top wall of the hollow supporting base over said opening therein, the sides of said centering cup being adapted to snugly grip the lower end portion of a mixing container to firmly hold the container with its bottom slightly spaced from the bottom of the cup, said container having an agitator mounted therein and provided with a coupling unit accessible from the bottom of the container, a boss depending from said centering cup and projecting down into the hollow base through said opening in the top wall thereof, an electric drive motor housed within the base and detachably suspended from said boss, and a driving element connected with the electric drive motor and projecting upwardly through an opening in the centering cup for driving connection with the coupling unit of the agitator.

5. In a drink mixer, the combination of a mixing container having a built in agitator disposed entirely above the bottom wall of the container, coupling means accessible from the bottom of the container for drivingly connecting the agitator with a driving element, a centering and supporting cup for the container having a substantially horizontal wall and a side wall outwardly tapered on its inner surface, the lower end of the container being exteriorally tapered in correspondence with the inner surface of the centering cup side wall, whereby the container is firmly gripped when inserted into the centering and supporting cup to be held by the cup against movement upon swinging of the container contents during the mixing operation, a drive element extending through said horizontal wall of the centering cup with a coupling part projected thereabove for engagement with the coupling means of the agitator, and a drive motor for said element beneath the centering cup.

6. In a drink mixer, the combination of a base having a hole in its top wall, a centering cup formed as a separate unit mounted on the base over said hole, a depending internally threaded hollow boss on the centering cup projecting down through said hole, the inner surface of the upstanding side wall of the centering cup being tapered outwardly, a mixing container having a built in agitator disposed entirely above the bottom wall of the container, coupling means accessible from the bottom of the container for drivingly connecting the agitator with a driving element, a drive motor having a part threaded into the internally threaded depending boss of the centering cup so that the drive motor is supported directly from the centering cup, and a driving element on the motor shaft projecting up through an opening in the bottom wall of the centering cup for engagement with the coupling means of the container when the container is placed on the centering cup, and the lower end of the container being exteriorally tapered in correspondence with the taper of the centering cup side wall to snugly fit therein so that the container is firmly held against movement by the side wall of the centering cup.

STEPHEN J. POPLAWSKI.